United States Patent
Tanii et al.

(10) Patent No.: US 8,781,422 B2
(45) Date of Patent: Jul. 15, 2014

(54) WIRELESS COMMUNICATION DEVICE AND CONTROL METHOD FOR WIRELESS COMMUNICATION DEVICE

(71) Applicant: Fujitsu Limited, Kawasaki (JP)

(72) Inventors: Takashi Tanii, Sapporo (JP); Mitsunori Maeda, Kawasaki (JP); Kazushige Kishigami, Sapporo (JP); Naohito Takayama, Yokohama (JP); Mitsuhiko Manpo, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/786,000

(22) Filed: Mar. 5, 2013

(65) Prior Publication Data

US 2013/0183918 A1 Jul. 18, 2013

Related U.S. Application Data

(63) Continuation of application No. PCT/JP2010/065661, filed on Sep. 10, 2010.

(51) Int. Cl.
*H04B 1/16* (2006.01)

(52) U.S. Cl.
USPC .......................... 455/209; 455/205

(58) Field of Classification Search
USPC ................................. 455/205, 209
See application file for complete search history.

(56) References Cited

U.S. PATENT DOCUMENTS

| | | | | |
|---|---|---|---|---|
| 5,867,544 | A | * | 2/1999 | Taniguchi ...................... 375/376 |
| 2002/0160708 | A1 | * | 10/2002 | Hane et al. ................... 455/3.06 |
| 2003/0139167 | A1 | * | 7/2003 | Ciccarelli et al. ............. 455/324 |
| 2003/0142758 | A1 | | 7/2003 | Sakaue et al. |
| 2004/0113833 | A1 | * | 6/2004 | Lee ................................. 342/20 |
| 2008/0123614 | A1 | | 5/2008 | Iida |

FOREIGN PATENT DOCUMENTS

| | | |
|---|---|---|
| JP | 2000-151553 A | 5/2000 |
| JP | 2002-290866 A | 10/2002 |
| JP | 2003-008485 A | 1/2003 |
| JP | 2003-298450 A | 10/2003 |
| JP | 2006-203686 A | 8/2006 |

OTHER PUBLICATIONS

International Search Report dated Nov. 2, 2010 in application No. PCT/JP2010/065661.

* cited by examiner

*Primary Examiner* — Creighton Smith
(74) *Attorney, Agent, or Firm* — Maschoff Brennan

(57) ABSTRACT

An antenna receives an RF signal and an RF signal at different frequency bands. An oscillator outputs a local oscillator signal at a frequency f1. An oscillator outputs a local oscillator signal at a frequency f2. A modulator modulates the frequency based on the local oscillator signal at the frequency f1 and the local oscillator signal at the frequency f2, and generates a plurality of local oscillator signals at different frequencies. A frequency converter mixes the plurality of local oscillator signals, at different frequencies, generated by the modulator, with the RF signal and the RF signal, and generates baseband signals of the RF signal and the RF signal. A signal processor performs a predetermined process for the baseband signals generated by the frequency converter.

18 Claims, 5 Drawing Sheets

WIRELESS COMMUNICATION DEVICE AND CONTROL METHOD FOR WIRELESS COMMUNICATION DEVICE

CROSS-REFERENCE TO RELATED APPLICATION

This application is continuation application of International Application PCT/JP2010/065661 filed on Sep. 10, 2010 and designating the U.S., the entire contents of which are incorporated herein by reference.

FIELD

The present invention relates to a wireless communication device and a control method for the wireless communication device.

BACKGROUND

At the present time, in the third generation mobile communication system or the next generation mobile communication system, a wireless communication system has been discussed in the 3GPP ($3^{rd}$ Generation Partnership Project), and various provisions have been established.

In the 3GPP, a plurality of frequency bands are prescribed as frequency bands to be used. The prescribed frequency bands are exclusively assigned respectively to a plurality of business operators. The business operators use the assigned frequency bands to provide wireless communication services.

Of the business operators, some business operator is assigned with a wide bandwidth included in one prescribed frequency band. This business operator performs wireless communication using signals of the same frequency band. A signal process can be performed simply using one local oscillator signal, thus one oscillator is enough.

Of the business operators, some business operator secures only a narrow bandwidth, because the bandwidth is used mainly by other business operators. Because it is difficult for this business operator to sufficiently secure a frequency bandwidth in one frequency band, the business operator secures the narrow bandwidth in a plurality of frequency bands, thereby possibly securing an adequate frequency bandwidth. Accordingly, when wireless communication is performed using the plurality of frequency bands, different local oscillator signals are used for the plurality of bands, thus requiring a plurality of oscillators. Also when simultaneously receiving signals at different frequency bands, a plurality of oscillators are used. From this point, generally, a set of one oscillator and one frequency converter is used. Thus, when simultaneously receiving signals at different frequency bands, two reception paths are used.

Conventionally, when two signals at different frequency bands are synthesized to generate one single, a wireless communication device illustrated in FIG. 7 has been used. In this wireless communication device, as illustrated in FIG. 7, signals received through the two different reception paths are processed respectively by a signal processor 901 and a signal processor 902. Then, the processed signals are synthesized by a signal-synthesizing unit 903 to generate one signal.

As a technique for processing different signals, according to one technique, signals at different frequency bands are added to the main signal and sent together. Then, the receiver demodulates each of the added signals. Further, the frequency stability of the main signal is kept using a difference of the added signals. As a technique using a quadrature demodulator, as illustrated in FIG. 7, according to a conventionally-proposed technique using a direct conversion system, signal regeneration is performed, using a local signal whose phase is shifted by $\pi/2$ in frequency conversion for each of the received signals on an I (In-phase) axis and a Q (Quadrature) axis.

Patent Literature 1: Japanese Laid-open Patent Publication No. 2000-151553

Patent Literature 2: Japanese Laid-open Patent Publication No. 2006-203686

SUMMARY

However, in the wireless communication device illustrated in FIG. 7, each of an oscillator 904 and an oscillator 905 is arranged in one-to-one correspondence to each of reception paths of particular frequencies. Thus, signals from one frequency band are received only through one reception path. To process signals included in different two frequency bands, two reception paths are used as illustrated in FIG. 7, resulting in increasing the circuit size.

In the conventional technique for retaining the frequency stability of the main signal, the frequency stability is secured using signals at different frequency bands, but the signals at different frequency bands are not received and synthesized. In a direct conversion system, because an IF filter is not used, it is easy to achieve widening of bandwidth in the receiver, but the signals at different frequency bands are not received and synthesized. That is, even with these conventional techniques, it is difficult to realize the small circuit size of the wireless communication device which receives the signals at two different frequency bands, and synthesizes the received signals to generate one signal.

A wireless communication device includes a signal receiver that receives a plurality of signals at different frequencies; a first oscillator that outputs a first local oscillator signal; a second oscillator that outputs a second local oscillator signal at a frequency different from a frequency of the first local oscillator signal; a modulator that generates a plurality of oscillator signals at different frequencies by performing frequency modulation based on the first local oscillator signal and the second local oscillator signal; a frequency converter that mixes the plurality of local oscillator signals at the different frequencies with the plurality of signals received by the signal receiver; and a signal processor that performs a predetermined process for the signals which are generated by the mixing of the frequency converter.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Descriptions will now be made to embodiments of a wireless communication device and a control method of the wireless communication device, according to the present invention, based on the drawings. The wireless communication device and the control method of the wireless communication device, according to the present invention, are not limited by the following embodiments.

First Embodiment

Figure 1:
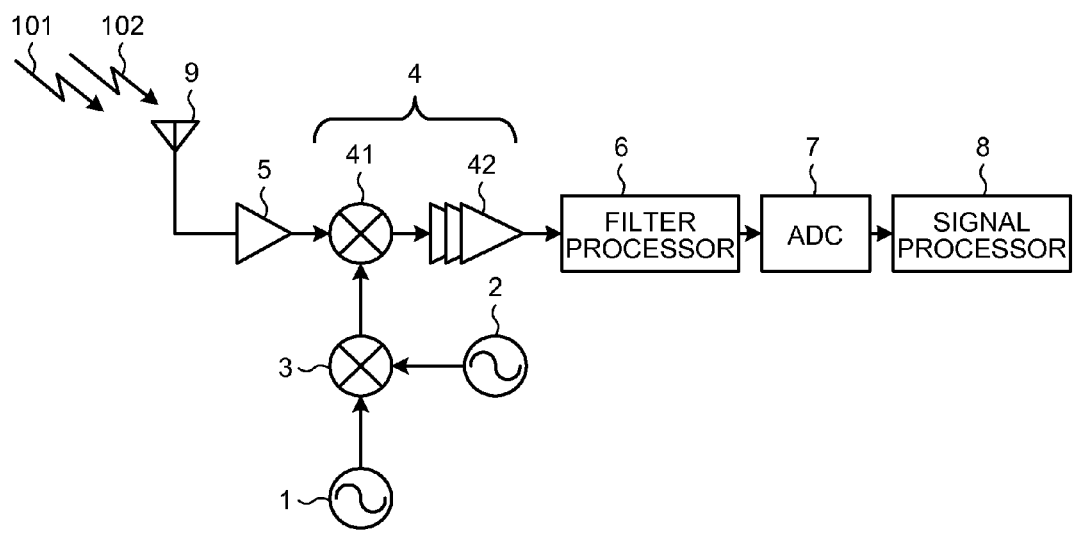
FIG. 1 is a block diagram of a wireless communication device according to a first embodiment.

FIG. 1 is a block diagram of the wireless communication device according to a first embodiment. As illustrated in FIG. 1, the wireless communication device according to the first embodiment has a first oscillator 1, a second oscillator 2, a modulator 3, a quadrature demodulator 4, an LNA (Low Noise Amplifier) 5, a filter processor 6, an ADC (Analog Digital Converter) 7, a signal processor 8, and an antenna 9. The wireless communication device according to the first embodiment uses a direct conversion system, and performs quadrature modulation.

The oscillator 1 outputs a local oscillator signal at an oscillating frequency f1 to the modulator 3. The oscillator 1 is one example of a first oscillating unit, and a local oscillator signal output by the oscillator 1 is one example of a first local oscillator signal.

The oscillator 2 outputs a local oscillator signal with an oscillating frequency f2 to the modulator 3. The oscillator 2 is one example of a second oscillating unit, and a local oscillator signal output by the oscillator 2 is one example of a second local oscillator signal. In this embodiment, f2 is a lower frequency than f1.

The frequency f1 and the frequency f2 are specified in advance by an operating person in a manner that "f1+f2" and "f1−f2" substantially coincide with frequencies of two kinds of to-be-received RF (Radio Frequency) signals.

The modulator 3 stores a modulation method for frequency, in advance. Specifically, in this embodiment, the modulator 3 stores equations for obtaining the difference and the sum of two input signals.

The modulator 3 receives a local oscillator signal at the oscillating frequency f1 from the oscillator 1. The modulator 3 receives a local oscillator signal at the oscillating frequency f2 from the oscillator 2. The modulator 3 calculates "f1+f2" as the sum of oscillating frequencies of two signals and "f1−f2" as a difference of frequencies of two signals, using the oscillating frequency f1 and the oscillating frequency f2 in the equations stored in advance.

The modulator 3 outputs a local oscillator signal having the oscillating frequency "f1+f2" and a local oscillator signal having the oscillating frequency "f1−f2", to the quadrature demodulator 4. Hereinafter, the local oscillator signal at the oscillating frequency "f1+f2" may be referred to as an "f1+f2 signal", while the local oscillator signal at the oscillating frequency "f1−f2" may be referred to as an "f1−f2 signal". The modulator 3 is one example of a modulation unit.

The antenna 9 receives a signal which has externally been sent. The antenna 9 receives an RF signal 101 and an RF signal 102 as two signals at different frequencies. Note that the frequency of the RF signal 101 is identified as an RF1, while the frequency of the RF signal 102 is identified as an RF2. The RF1 and the RF2 may be referred to as receiving frequencies. The frequency band including the RF1 for use in communication with the wireless communication device according to the first embodiment is mixed with the f1+f2 signal, thereby being converted into a predetermined frequency. Further, the frequency including the RF2 for use in communication with the wireless communication device according to the first embodiment is mixed with the f1−f2 signal, thereby being converted into a predetermined frequency as the same as that of the RF1. In the first embodiment, the direct conversion system is used. Thus, the converted frequency is nearly zero. These frequency bands are allowed to be used by the wireless communication device according to the first embodiment for wireless communication. To the RF signal 101 and the RF signal 102, different spreading codes are assigned and added.

Figure 2:
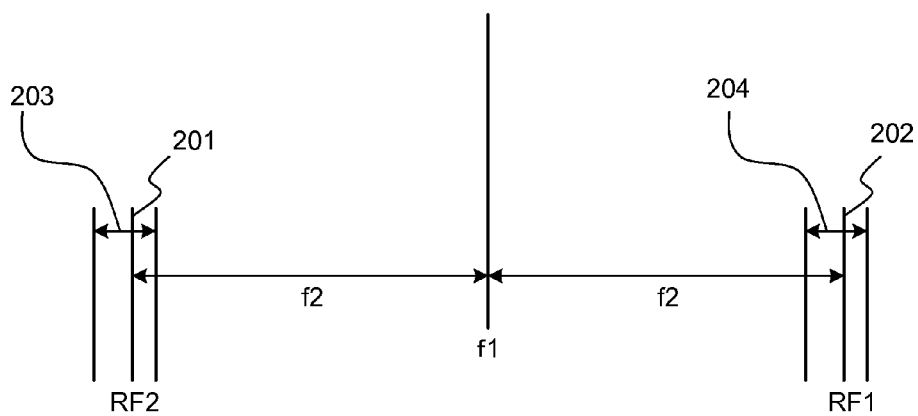
FIG. 2 is a schematic diagram illustrating the relationship between a receiving frequency and an oscillating frequency.

Descriptions will now be made to the relationships between the RF1 and the RF2 and the f1 and f2, with reference to FIG. 2. FIG. 2 is a schematic diagram illustrating the relationship between the receiving frequency and the oscillating frequency. As described above, in this embodiment, a value 201 obtained by subtracting f2 from f1 coincides with the RF2, because the direct conversion system is used, as illustrated in FIG. 2. That is, f1−f2=RF2. The value 201 is included in a frequency band 203 including the RF2. A value 202 obtained by adding f2 to f1 coincides with the RF1. That is, f1+f2=RF1. The value 202 is included in a frequency band 204 including the RF1. In this first embodiment, the ranges of the frequency bandwidths including the RF1 and RF2 are approximately 100 MHz (Mega Hertz).

The LNA 5 amplifies the RF signal 101 and the RF signal 102 received by the antenna 9. The LNA 5 outputs the amplified RF signal 101 and the RF signal 102 to the quadrature demodulator 4. The antenna 9 and the LNA 5 are examples of a signal-receiving unit.

The quadrature demodulator 4 has a frequency converter 41, a variable gain amplifier 42, and a phase shifter (not illustrated). The frequency converter 41 is one example of a frequency conversion unit.

The quadrature demodulator 4 receives the f1+f2 signal and the f1−f2 signal from the modulator 3. In addition to the f1+f2 signal and the f1−f2 signal, signals are generated from the phase shifter by shifting the f1+f2 signal and the f1−f2 signal by ninety degrees. The frequency converter 41 receives the original phase f1+f2 signal and f1−f2 signal and the ninety-degree phase shifted f1+f2 signal and f1−f2 signal. The frequency converter 41 receives the RF signal 101 and the RF signal 102 from the LNA 5. The frequency converter 41 mixes the RF signal 101, the RF signal 102, the original phase f1+f2 signal and f1−f2 signal, and the ninety-degree phase shifted f1+f2 signal and f1−f2 signal, to acquire baseband signals of an I signal and a Q signal. In the first embodiment, the frequency converter 41 subtracts a local oscillator signal from the RF signal, thereby acquiring a baseband signal. When the RF signal 101, the RF signal 102, and the f1+f2 signal are mixed, the RF signal 101 is converted into a baseband signal at a predetermined frequency. However, the RF signal 102 is converted into a baseband signal at a different frequency from the predetermined frequency. By using a bandpass filter, a signal including the RF signal 102 mixed with the f1+f2 signal is removed. Similarly, when the RF signal 101, the RF signal 102, and the f1−f2 signal are mixed, the RF signal 102 is converted into a baseband signal at a predetermined frequency, while the RF signal 101 is converted into a baseband signal at a different frequency from the predetermined frequency. By using a bandpass filter, a signal including the RF signal 101 mixed with the f1−f2 signal is removed. The frequency converter 41 shifts the phase of the local oscillator signal by ninety degrees, thereby acquiring a baseband signal separated into an I signal and a Q signal. The frequency converter 41 outputs a baseband signal of the RF signal 101 and a baseband signal of the RF signal 102, separated into the I signal and the Q signal, to the variable gain amplifier 42.

The variable gain amplifier 42 receives inputs of the baseband signal of the RF signal 101 and the baseband signal of the RF signal 102, separated into the I signal and the Q signal, from the frequency converter 41. The variable gain amplifier 42 amplifies the baseband signal of the RF signal 101 and the baseband signal of the RF signal 102, separated into the I signal and the Q signal, and adjusts them into a level suitable for performing AD (Analog Digital) conversion. The variable gain amplifier 42 outputs the amplified baseband signal of the RF signal 101 and the amplified baseband signal of the RF signal 102, separated into the I signal and the Q signal, to the filter processor 6.

The filter processor 6 receives inputs of the baseband signal of the RF signal 101 and the baseband signal of the RF signal 102, separated into the I signal and the Q signal, from the variable gain amplifier 42. The filter processor 6 performs a filtering process for the baseband signal of the RF signal 101 and the baseband signal of the RF signal 102, separated into the I signal and the Q signal, and removes a noise component of a high frequency and a leak component from another circuit. The filter processor 6 outputs the filtered baseband signal of the RF signal 101 and the filtered baseband signal of the RF signal 102, separated into the I signal and the Q signal, to the ADC 7.

The ADC 7 receives inputs of the baseband signal of the RF signal 101 and the baseband signal of the RF signal 102, separated into the I signal and the Q signal, from the filter processor 6. The ADC 7 converts the baseband signal of the RF signal 101 and the baseband signal of the RF signal 102, separated into the I signal and the Q signal, from an analog signal to a digital signal. The ADC 7 outputs the digitally-converted baseband signal of the RF signal 101 and the digitally-converted baseband signal of the RF signal 102, separated into the I signal and Q signal, to the signal processor 8.

The signal processor 8 receives inputs of the baseband signal of the RF signal 101 and the baseband signal of the RF signal 102, separated into the I signal and the Q signal, from the ADC 7. The signal processor 8 determines whether each signal is the RF signal 101 or the RF signal 102, based on the spreading code of each input signal. In this manner, by using the spreading code, the signal processor 8 can separate the RF signal 101 and the RF signal 102 which are input in an embedded form. The signal processor 8 performs a signal process, such as phase adjustment or signal synthesizing, for the baseband signal of the separated RF signal 101 and the baseband signal of the RF signal 102. By separating the RF signal 101 and the RF signal 102, the signal processor 8 can perform processes respectively for the two simultaneously received signals. After this, the signal processor 8 causes an output unit (not illustrated) to output, using the processed signal. For example, the signal processor 8 makes the speaker to output a voice using the processed signal.

Figure 3:
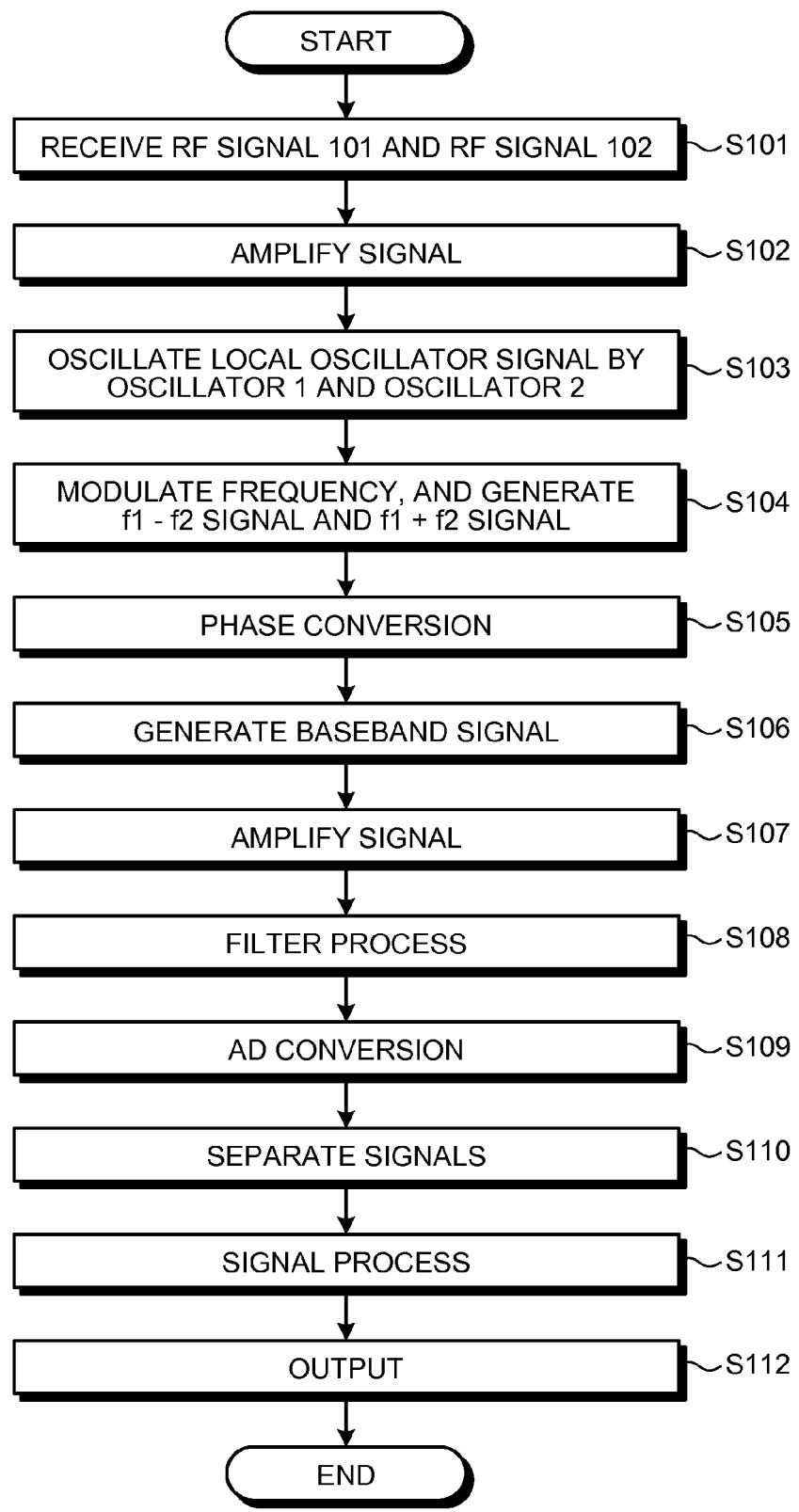
FIG. 3 is a flowchart of a process for a received signal in the wireless communication device according to the first embodiment.

Descriptions will now be made to a process for a received signal in the wireless communication device according to this embodiment, with reference to FIG. 3. FIG. 3 is a flowchart for the process for the received signal in the wireless communication device according to the first embodiment.

The antenna 9 receives the RF signal 101 and the RF signal 102 (Step S101).

The LNA 5 amplifies the RF signal 101 and the RF signal 102 (Step S102).

The oscillator 1 oscillates a local oscillator signal at the oscillating frequency f1, while the oscillator 2 oscillates a local oscillator signal at the oscillating frequency f2 (Step S103).

The modulator 3 modulates the local oscillator signals input from the oscillator 1 and the oscillator 2, and generates the f1+f2 signal and the f1−f2 signal (Step S104).

The quadrature demodulator 4 generates signals in which the phases are converted, by shifting the phases of the f1+f2 signal and the f1−f2 signal by ninety degrees using a phase shifter (Step S105).

The frequency converter 41 mixes the original phase f1+f2 signal and f1−f2 signal and the ninety-degree phase shifted f1+f2 signal and f1−f2 signal, with the RF signal 101 and the RF signal 102. The frequency converter 41 generates a baseband signal of the RF signal 101 and a baseband signal of the RF signal 102, separated into an I signal and a Q signal (Step S106).

The variable gain amplifier 42 amplifies the baseband signal of the RF signal 101 and the baseband signal of the RF signal 102, separated into the I signal and the Q signal, to attain the level suitable for performing AD conversion (Step S107).

The filter processor 6 performs a filtering process for the baseband signal of the RF signal 101 and the baseband signal of the RF signal 102, separated into the I signal and the Q signal, and processes a noise component thereof and the like (Step S108).

The ADC 7 converts the baseband signal of the RF signal 101 and the baseband signal of the RF signal 102, separated into the I signal and the Q signal, from an analog signal to a digital signal (Step S109).

The signal processor 8 determines whether each signal is the RF signal 101 or the RF signal 102, and separates the signals, using the spreading code of the input signal (Step S110). The signal processor 8 performs a signal process for the baseband signal of the separated RF signal 101 and the baseband signal of the separated RF signal 102 (Step S111). The signal processor 8 causes the output unit to output the signal using the processed signal (Step S112).

As described above, the wireless communication device according to the first embodiment uses local oscillator signals at different frequencies from the two oscillators, thereby enabling to simultaneously receive the RF signals included in different frequency bands, in one signal processor. That is, a process can be performed for a plurality of frequency bands through one reception path. This enables to reduce the circuit size of the wireless communication device which can simultaneously receive signals at a plurality of different frequency bands. Thus, when the business operator that uses the narrow bandwidth range in each frequency band intends to increase the throughput while retaining the wide signal bands as a whole, a wireless communication device with the small scale can be used. This can contribute to lowering the cost of communication business of the above business operator.

In the wireless communication device according to this embodiment, one oscillator oscillates a local oscillator signal at an intermediate frequency of the two received signals, while the other oscillator oscillates a signal at a frequency as a difference between the intermediate frequency and the frequency of each signal. As a result, as compared with a case of oscillating the signal at the same frequency as the frequency of the directly-received signal, it is possible to lower the consumption power of the oscillator which oscillates the signal at a frequency as a difference from the intermediate frequency of each signal to the frequency of each signal.

In this embodiment, the descriptions have been made to the direct conversion system with the receiving method using quadrature modulation. However, any other receiving method may be used, as long as the method is for directly or indirectly generating a baseband signal using the frequency conversion. For example, a heterodyne system or a super-heterodyne system may be used, or a configuration without phase modulation may be used. For example, when the super-heterodyne system is used, f1 and f2 are selected in a manner that the intermediate frequency exists between a frequency difference between the RF signal 101 and the f1+f2 signal and a frequency difference between the RF signal 102 and the f1−f2 signal.

Further, in this embodiment, the descriptions have been made to a case of receiving signals included in different frequency bands, as illustrated in FIG. 2. This is the same even in a case of receiving signals at different frequencies included in the same frequency band. To receive signals at different frequencies included in the same frequency band, a frequency of the local oscillator signal of the oscillator 1 is set as an intermediate signal of two to-be-received frequencies, and a frequency of the local oscillator signal of the oscillator 2 is set as half of a difference of the to-be-received frequencies. In the same frequency band, the difference of receiving frequencies is approximately dozens of MHz (Mega Hertz), and is lower by one digit than several hundred Hz to several GHz (Giga Hertz) receiving frequencies. If the frequency increases, the consumption power increases. As compared to a case of oscillating local oscillator signals at the same frequencies as the two frequencies to be received from the oscillators, the total consumption power can be lowered by retaining the local oscillator signal from the oscillator 2 half the difference of the two to-be-received frequencies.

Second Embodiment

Figure 4:
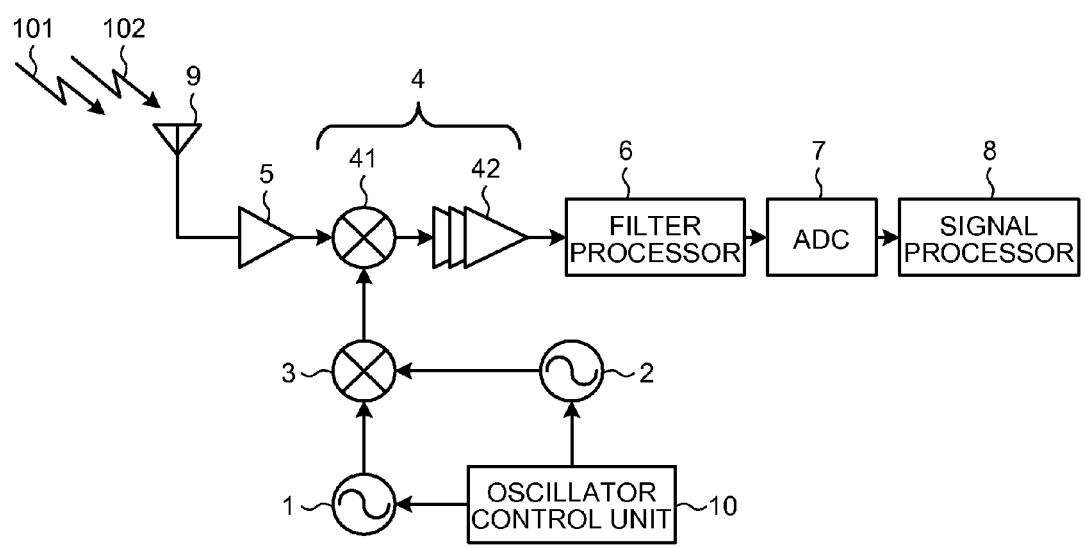
FIG. 4 is a block diagram of a wireless communication device according to a second embodiment.

FIG. 4 is a block diagram of a wireless communication device according to a second embodiment. In the wireless communication device according to the second embodiment, what differs from that of the first embodiment is that oscillation by the oscillator is executed or prohibited in accordance with particular control. Descriptions will now be made mainly to control of the oscillator 1 and the oscillator 2. In FIG. 4, the parts having the same reference numerals as those of FIG. 1 have the same functions, unless otherwise described.

As illustrated in FIG. 4, the wireless communication device according to the second embodiment includes an oscillator control unit 10, in addition to the configuration as the wireless communication device of the first embodiment illustrated in FIG. 1.

The oscillator control unit 10 receives an input of a frequency of a to-be-received RF signal specified by an operator, from an input unit (not illustrated). When the frequency of the to-be-received RF signal is f1, the oscillator control unit 10 controls the oscillator 1 to oscillate, and prohibits oscillation of the oscillator 2. When the frequency of the to-be-received RF signal 101 is f2, the oscillator control unit 10 prohibits oscillation of the oscillator 1, and controls the oscillator 2 to oscillate. Further, when the frequencies of the to-be-received RF signals are "f1+f2" and "f1−f2", the oscillator control unit 10 controls both of the oscillator 1 and the oscillator 2 to oscillate. Descriptions will now be made to a case in which a signal of one type of frequency is received, as the RF signal 101.

When the frequency of the to-be-received RF signal 101 is "f1+f2", and when the frequency of the RF signal 102 is "f1−f2", the same applies to this embodiment as that of the first embodiment. Descriptions will now be made to a case in which the to-be-received signal is only the RF signal 101 at the frequency f1 or f2.

When the frequency of the RF signal 101 is f1, the modulator 3 receives an input of a local oscillator signal at the oscillating frequency f1 only from the oscillator 1. In this case, if the modulator 3 obtains a difference and the sum of local oscillator signals from the oscillator 1 and the oscillator 2, the oscillating frequency f1 can be obtained. The modulator then 3 outputs only the local oscillator signal having the oscillating frequency f1 to the quadrature demodulator 4.

Similarly, when the frequency of the to-be-received RF signal 101 is f2, the modulator 3 receives an input of a local oscillator signal having the oscillating frequency f2 only from the oscillator 1. In this case, if the modulator 3 obtains a difference and the sum of local oscillator signals from the oscillator 1 and the oscillator 2, the oscillating frequency f2 can be obtained. The modulator 3 then outputs only the local oscillator signal having the oscillating frequency f2 to the quadrature demodulator 4.

When the frequency of the RF signal 101 is f1, the quadrature demodulator 4 generates a baseband signal of the RF signal 101, separated into an I signal and a Q signal, using the local oscillator signal having the oscillating frequency f1. Similarly, when the frequency of the to-be-received RF signal 101 is f2, the quadrature demodulator 4 generates a baseband signal of the RF signal 101, separated into the I signal and the Q signal, using the local oscillator signal having the oscillating frequency f2.

After this, the generated baseband signal is output as a voice. Specifically, at this time, the baseband signal is amplified by the variable gain amplifier 42, filtering-processed by the filter processor 6, analog/digital-converted by the ADC 7, and signal-processed by the signal processor 8.

Figure 5:
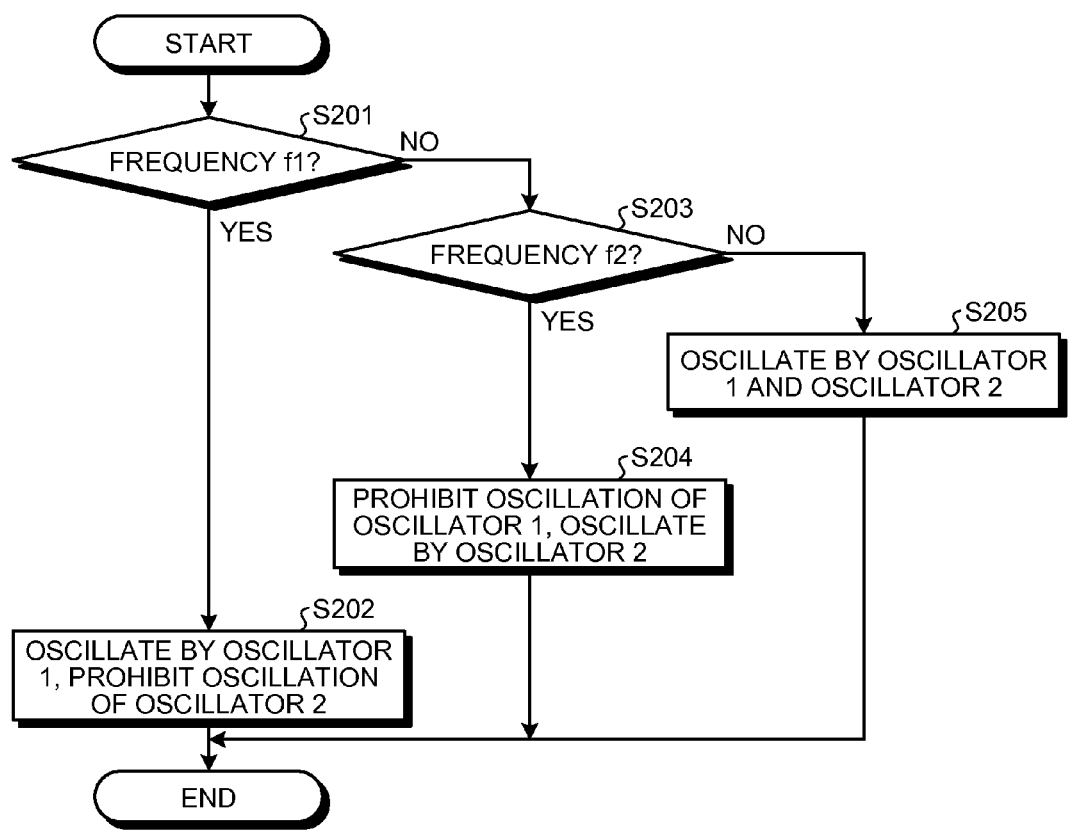
FIG. 5 is a flowchart of a modulation process for an oscillating frequency.

Descriptions will now be made to a control process for the oscillator 1 and the oscillator 2, using FIG. 5. FIG. 5 is a flowchart for controlling the oscillator in the wireless communication device according to the second embodiment.

The oscillator control unit 10 determines whether a to-be-received signal is only the RF signal 101 at the frequency f1 (Step S201). When the to-be-received signal is only the RF signal 101 having the frequency f1 (Step S201: Positive), the oscillator control unit 10 controls the oscillator 1 to oscillate, and prohibits oscillation of the oscillator 2 (Step S202).

On the contrary, when the to-be-received signal is not only the RF signal 101 at the frequency f1 (Step S201: Negative), the oscillator control unit 10 determines whether the to-be-received signal is only the RF signal 101 having the frequency f2 (Step S203). When the to-be-received signal is only the RF signal 101 having the frequency f2 (Step S203: Positive), the oscillator control unit 10 prohibits oscillation of the oscillator 1, and controls the oscillator 2 to oscillate (Step S204).

On the contrary, when the to-be-received signal is not only the RF signal 101 having the frequency f2 (Step S203: Negative), the oscillator control unit 10 determines that the to-be-received signals are the RF signal 101 at the frequency "f1+f2" and the RF signal 102 at the frequency "f1−f2". The oscillator control unit 10 controls both of the oscillator 1 and the oscillator 2 to oscillate (Step S205).

As described above, the wireless communication device according to the second embodiment can receive only the signal at the frequency f1, receive only the signal at the frequency f2, and simultaneously receive signals at the frequency "f1+f2" and the frequency "f1−f2". Therefore, the wireless communication device according to the second embodiment controls the oscillators, thereby executing three kinds of signal processes.

(Modification)

Figure 6:
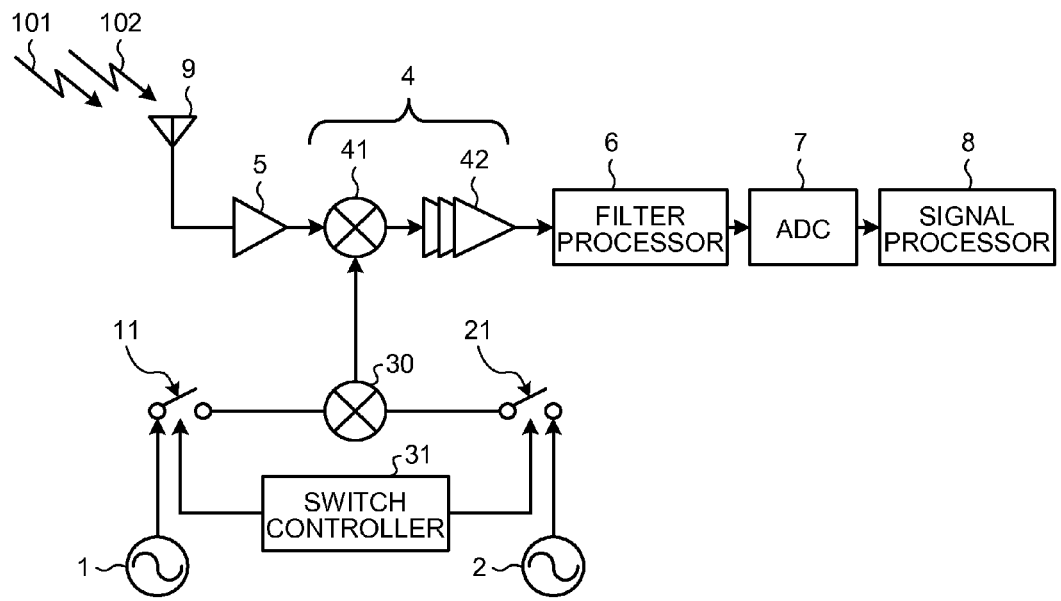
FIG. 6 is a block diagram of a modification of the wireless communication device according to the second embodiment.
Figure 7:
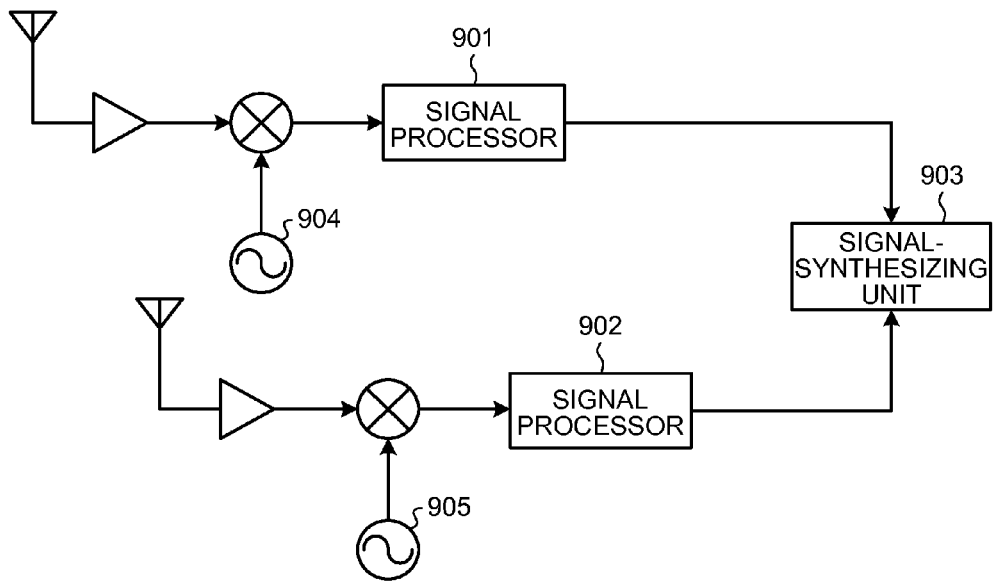
FIG. 7 is a diagram for explaining a conventional wireless communication device which simultaneously receives signals at different frequencies.

FIG. 6 is a block diagram of a modification of the wireless communication device according to the second embodiment. As illustrated in FIG. 6, unlike the second embodiment, in a wireless communication device according to the modification, a coupler 30 is arranged in place of the modulator 3, and a switch 11 and a switch 21 are arranged between the oscillators 1 and 2 and the coupler 30. These switches 11 and 21 are examples of connecting switches.

A switch controller 31 receives an input of the frequency of a to-be-received RF signal, and controls ON/OFF of the switch 11 and the switch 21. Specifically, the switch controller 31 controls the switch 11 to be ON, when a local oscillator signal from the oscillator 1 is input to the coupler 30, and controls the switch 11 to be OFF, when a local oscillator signal from the oscillator 1 is not input to the coupler 30. The switch controller 31 controls the switch 21 to be ON, when a local oscillator signal from the oscillator 2 is input to the coupler 30, and controls the switch 21 to be OFF, when a local oscillator signal from the oscillator 2 is not input to the coupler 30. For example, if a to-be-received signal is only the RF signal 101 having the frequency f1, the switch controller 31 controls the switch 11 to be ON, and controls the switch 21 to be OFF. If the to-be-received signals are the RF signal 101 having the frequency "f1+f2" and the RF signal 102 having the frequency "f1−f2", the switch controller 31 controls both of the switch 11 and the switch 21 to be ON.

The coupler 30 couples the input signals. For example, when the local oscillator signals are input from both of the oscillator 1 and the oscillator 2, the coupler 30 couples the local oscillator signal with the oscillating frequency f1 oscillated from the oscillator 1, to the local oscillator signal with the oscillating frequency f2 oscillated from the oscillator 2. At this time, the coupler 30 reverses the sign of the f2 signal to have 42, to couple f1 and f2 and couple f1 and −f1. As a result, the coupler 30 generates an "f1+f2" signal and an "f1−f2" signal. The coupler 30 outputs the "f1+f2" signal and "f1−f2" signal to the quadrature demodulator 4.

On the contrary, when the signal only from either one of the oscillator 1 and the oscillator 2, the coupler 30 outputs the input signal to the quadrature demodulator 4.

In this embodiment, a combination of the coupler and the switches are used for controlling the input from the oscillator and for modulating the frequency. However, instead of the combination, a combination of a modulator and a switch may be used.

As described above, the wireless communication device according to this modification controls to input a local oscillator signal using the switch, and is enabled to change the type of the local oscillator signal for use in the frequency conversion. As a result, when receiving a signal of one frequency band, it can be received in a state where only one oscillator is connected, thus reducing the noise.

In this modification, it is possible to receive signals at different two frequencies included in the same frequency band. In this case, it is considered to oscillate signals at the same frequency as those of the two signals received by the oscillator 1 and the oscillator 2. In this configuration, the total consumption power can be reduced, if the half frequency of the difference between frequencies of the two received signals is used as a local oscillator signal of the oscillator 2, as described in the first embodiment.

According to an aspect of the wireless communication device and the control method for the wireless communication device according to the present invention, signals at different frequency bands can be processed through one reception path. This results in an effect of reducing the circuit size of the wireless communication device which simultaneously receives signals at different frequencies.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication device comprising:
    a signal receiver that receives a plurality of signals at different frequencies;
    a first oscillator that outputs a first local oscillator signal;
    a second oscillator that outputs a second local oscillator signal at a frequency different from a frequency of the first local oscillator signal;
    a modulator that generates a plurality of oscillator signals at different frequencies by performing frequency modulation based on the first local oscillator signal and the second local oscillator signal;
    a frequency converter that mixes the plurality of local oscillator signals at the different frequencies with the plurality of signals received by the signal receiver; and
    a signal processor that performs a predetermined process for the signals which are generated by the mixing of the frequency converter.

2. The wireless communication device according to claim 1, wherein:
    the signal receiver receives two signals at different frequencies; and
    the modulator generates two local oscillator signals at different frequencies.

3. The wireless communication device according to claim 2, wherein
    the first local oscillator signal has an intermediate frequency between the two signals at the different frequencies, and the second local oscillator signal has a frequency as a difference between the frequency of the first local oscillator signal and the frequencies of the two signals at the different frequencies.

4. The wireless communication device according to claim 1, wherein
    the modulator generates a local oscillator signal at a frequency as a difference between the frequency of the first local oscillator signal and the frequency of the second oscillator signal and a local oscillator signal at a frequency as a sum thereof.

5. The wireless communication device according to claim 1,
    wherein the signal receiver receives a plurality of signals at different frequencies or one signal at one single frequency, and
    further comprising an oscillator controller that controls either the first oscillator or the second oscillator to oscillate, when the signal receiver receives the one signal at the one single frequency, and controls both the first oscillator and the second oscillator to oscillate, when the signal receiver receives the plurality of signals at the different frequencies.

6. The wireless communication device according to claim 1,
wherein the signal receiver receives a plurality of signals at different frequencies and one signal at one single frequency, and
further comprising:
a plurality of connecting switches that are provided respectively between the first oscillator and the modulator and between the second oscillator and the modulator; and
a switch controller that turns one of the connecting switches ON and turns other connecting switch OFF, when the signal receiver receives the one signal at one single frequency, and turns both of the connecting switches ON, when the signal receiver receives the plurality of signals at the different frequencies.

7. The wireless communication device according to claim 6, wherein
the modulator is a coupler.

8. The wireless communication device according to claim 1, wherein
the plurality of signals at the different frequencies are included in one frequency band having a preset range of a bandwidth.

9. The wireless communication device according to claim 1, wherein
the plurality of signals at the different frequencies are included in a plurality of different frequency bands having preset ranges of bandwidths.

10. The wireless communication device according to claim 1, wherein
the modulator subtracts the plurality of local oscillator signals from the signals at the different frequencies that the signal receiver has received, thereby mixing the signals, and generating intermediate frequencies or baseband signals.

11. A wireless communication device comprising:
a signal receiver that receives a plurality of signals at different frequencies;
a first oscillator that outputs a first local oscillator signal;
a second oscillator that outputs a second local oscillator signal at a frequency different from a frequency of the first local oscillator signal;
a modulator that generates a plurality of local oscillator signals at different frequencies by performing frequency modulation based on the first local oscillator signal and the second local oscillator signal;
a quadrature demodulator that generates baseband signals of the respective plurality of signals received by the signal processor, based on the plurality of local oscillator signals at the different frequencies; and
a signal processor that performs a predetermined process for the baseband signals.

12. The wireless communication device according to claim 11, wherein:
the signal receiver receives two signals at different frequencies; and
the modulator generates two local oscillator signals at different frequencies.

13. The wireless communication device according to claim 12, wherein
the first local oscillator signal has an intermediate frequency between the two signals at the different frequencies, and the second local oscillator signal has a frequency as a difference between the frequency of the first local oscillator signal and the frequencies of the two signals at the different frequencies.

14. The wireless communication device according to claim 11, wherein
the modulator generates a local oscillator signal at a frequency as a difference between the frequency of the first local oscillator signal and the frequency of the second oscillator signal and a local oscillator signal at a frequency as a sum thereof.

15. The wireless communication device according to claim 11,
wherein the signal receiver receives a plurality of signals at different frequencies or one signal at one single frequency, and
further comprising an oscillator controller that controls either the first oscillator or the second oscillator to oscillate, when the signal receiver receives the one signal at the one single frequency, and controls both the first oscillator and the second oscillator to oscillate, when the signal receiver receives the plurality of signals at the different frequencies.

16. The wireless communication device according to claim 11, wherein
the plurality of signals at the different frequencies are included in one frequency band having a preset range of a bandwidth.

17. The wireless communication device according to claim 11, wherein
the plurality of signals at the different frequencies are included in a plurality of different frequency bands having preset ranges of bandwidths.

18. A control method for a wireless communication device, the method comprising:
receiving a plurality of signals at different frequencies;
outputting a first local oscillator signal;
outputting a second local oscillator signal at a frequency different from a frequency of the first local oscillator signal;
generating a plurality of local oscillator signals at different frequencies by performing frequency modulation based on the first local oscillator signal and the second local oscillator signal;
mixing the plurality of local oscillator signals at the different frequencies with the plurality of signals received by the receiving; and
performing a predetermined process for the signals generated by the mixing.

* * * * *